UNITED STATES PATENT OFFICE 2,576,082

PLANT GROWTH REGULATION

Nathaniel Tischler, Palmyra, N. J., and Ernest P. Bell, Detroit, Mich., assignors to Sharples Chemicals Inc., a corporation of Delaware No Drawing. Application December 6, 1949, Serial No. 131,502

19 Claims. (Cl. 71—2.5)

The present invention relates to an improved method and compositions for treating growing plants whereby the normal life cycle of a plant is altered with advantageous results. More particularly it relates to a process and compositions for treating growing plants with 3,6-endoxo-1,2,3,6-tetrahydro-orthophthalic acid.

This acid is capable of existing in three separate and distinct geometrically isomeric forms, namely, the exo-cis isomer, the endo-cis isomer, and the trans isomer, as defined in the case of the hexahydro compounds by Woodward and Baer, Journal of the American Chemical Society, 70, 1161–1166. Of these three isomers the exo-cis isomer is preferred in view of its generally greater activity. Furthermore, the exo-cis isomer can be prepared more economically and conveniently.

The acid employed in this invention is unusually versatile, first, with respect to the types of plant response which it is capable of inducing, second, with respect to the types of plants upon which it exerts useful effects, and third, with respect to the forms in which it may be used, the latter including, for example, anhydrides and water-soluble salts.

For example, this acid may bring about such effects as leaf abscission (partial or complete), blossom thinning, vine-kill, total destruction of the plant, adventitious root formation, or delay of fruit drop, the particular plant response manifested depending to a large extent upon the applied concentration of the response agent, and the species and degree of maturity of the plant undergoing treatment. The term plant as used herein is understood to include all portions of the plant, such as the roots, stems, leaves, blossoms, seeds, and fruits.

While under suitable conditions any of the foregoing effects may be induced, depending upon the conditions of treatment, the treatment is particularly outstanding in the accelerated induction of plant physiological effects such as defoliation, or such as selective or non-selective killing of plants, and for convenience will be described more particularly with reference thereto. Induced defoliation is the hastened abscission of foliage, brought about by causing certain accelerated physiological effects in certain plants which usually defoliate normally at some stage of their life cycle, such as, at the onset of the winter season; whereas plant kill is a drastic phytotoxic effect of importance in the extermination of dicotyledonous weeds (usually broadleafed plant species) and of monocotyledonous weeds (including various species of grasses), etc.

It is well known that the presence of excessive foliage at the time of harvesting is undesirable in the case of many crops among which may be mentioned cotton, potatoes, tomatoes, and beans such as soy beans and lima beans. This is particularly true if the crop is to be harvested mechanically. Controlled defoliation greatly facilitates harvesting, and in many circumstances also results in marked improvement in the quality and/or ripening time of the product. Furthermore, the elimination of foliage, after it has served its primary purpose, may be effective in avoiding or minimizing certain late season blights, and/or other undesirable developments. Early defoliation of nursery stock is often desirable to permit the digging and preparation of the stock for shipment at a more convenient time.

By a defoliant is meant a substance which, upon penetrating, in suitable concentration, the epidermal layer of a growing plant which normally tends to defoliate during its life cycle (usually after maturity), brings about an accelerated abscission of the leaves without causing complete destruction of the plant. The ultimate goal in defoliation might be considered to be complete abscission of leaves coupled with negligible injury to the rest of the plant insofar as the final maturation of the crop is concerned. A measure of the value of a defoliant, generally speaking, is the extent to which this ultimate objective is attained. For practicable utility, moreover, the defoliating agent (i. e. defoliant) must be effective in relatively low concentration.

Various substances have been suggested as defoliants among which may be mentioned pentachlorophenol, cyanamides, sulfamates, fluorides, thiocyanates, and chlorates. Insofar as the applicants are aware, however, no outstandingly satisfactory defoliant has heretofore been developed.

The present invention, on the other hand, provides an effective and economical means of defoliating plants which undergo seasonal leaf abscission in the course of their normal life cycle. It is of particular value commercially in the defoliation of cotton, Irish potatoes (i. e. the common white potatoes), sweet potatoes, soy beans, tomatoes, and other plants.

This invention also provides an economical and effective means of destroying undesirable vegetation including many species of unwanted herbs, grasses, ferns, etc. In some instances it may be desired to practice selective destruction of the unwanted species, without causing appreciable damage to desirable species growing in the same area, while in other instances it may be desired to destroy all plants growing in a given area. When the plant response agent is employed as a weed killer, it is usually desirable, though not essential, that it be applied to the weed prior to full maturity, and preferably when said weeds (i. e. objectionable plants) are fairly young. In some instances, moreover, it may be desirable to kill useful crops, such as for military purposes or to control production, and the invention may advantageously be adapted to such objectives.

To prevent germination of weed seeds and to destroy weed seedlings and plants, various practices are followed in accordance with the particular purpose desired. In some cases, it is desired to prevent the growth and/or to destroy all of the plants in a given locality, such as on tennis courts and other sports fields, in tracts about various buildings such as offices, factories, and barnyards, along fences, along power or railroad rights-of-way, highways, etc.

In other cases, such as in agricultural practices or in the maintenance of lawns, it is desired to prevent the growth and/or to cause the destruction of obnoxious weeds with little or no attendant damage to crop plants. Chemicals employed in such practices are referred to as selective weedkillers. For example, certain chemicals are said to destroy young weeds in onion fields with no or but temporary setback to the onion crop.

The chemicals which have been proposed for such selective killing of plant species are relatively few; they include thiocyanates, cyanates, chlorinated phenols, dinitrocresols, and, more recently, chlorinated phenoxy aliphatic acids, especially 2,4-dichlorophenoxyacetic acid (hereinafter referred to as 2,4-D). Those available have the disadvantage that they are either relatively ineffective against the large, broadleafed weeds and/or give poor control of annual grasses unless used in such large amounts as to cause crop injury. Contrarily, the acid of this invention can be used at such rates of chemical per acre as to give a much greater margin of safety in the control of both broadleafed weeds and annual grasses without injury to certain crops, for example, onions.

In the selective prevention or destruction of undesired weed seedlings or plants, three special kinds of practices have been followed: pre-planting treatments, pre-emergence treatment, and post-emergence treatment. By pre-planting treatment is meant the application of either sprays or dusts, but more commonly sprays, to the soil previous to planting of the crop seeds or plants, usually from one to three weeks previously. By pre-emergence treatment is meant the application of either sprays or dusts, but more commonly sprays, to the soil after the seeds have been planted but before the emergence of the crop seedlings. By post-emergence treatment is meant the application of either sprays or dusts, but more commonly sprays, after the plants have emerged from the soil or after transplanted plants have established themselves. Such post-emergence treatments are usually made while the weed plants are quite small, since in general less chemical is required to destroy young weed plants than fairly mature weeds.

The objective in the case of the pre-planting practice is to destroy weed seeds, weed seedlings, and more fully grown weed plants, before planting the crop seeds or plants so that the herbicidal chemical either will be leached from the soil by rainfall, or will volatilize, if it is one of sufficiently high vapor pressure, or will be decomposed, as for example by micro-organisms, in the soil, so that there will be no chance of injury by the chemical to crop plants.

The objective in the case of pre-emergence practice is to destroy young weed seedlings or plants before the crop seeds germinate or before they emerge from the soil.

In the case of post-emergence practice, as a rule, selective herbicidal chemicals must be applied in lower amounts per area than when the same chemicals are applied as pre-emergence agents.

The value of an herbicidal chemical especially where it is capable of serving as a selective one, depends on two main factors: the ability of the chemical to be absorbed into the plant where applied and, once absorbed, the ability of the chemical to be translocated to portions of the plant away from the locus of application so that it can bring about plant physiological responses at these distant plant tissues. It is generally recognized that applications of herbicides to root systems or to wounded stem surfaces bring about translocated effects of a systemic nature. Aside from plant regulatory chemicals like 2,4-D and other such stimulatory plant hormones which readily bring about translocated response, no matter where applied, the usual herbicides such as thiocyanates, cyanates, chlorinated phenols, and dinitrophenols and cresols and their salts cause localized effects only where treatments are applied.

The acid of this invention, and particularly the exo-cis isomer thereof, brings about striking translocated effects. This fact can be readily demonstrated by applying said acid, for example, in either lanolin or a high molecular weight polyethylene glycol (e. g. Carbowax 1500) pastes to lower portions of the stem, such as the hypocotyl in the case of beans, which is below the primary leaves. Such applications induce defoliation of primary leaves such as of young bean plants as well as cause severe inhibition of the terminal trifoliate shoot development of such species.

A special, outstanding value of this acid resides in the fact that it is much more effective in the control of most of the grassy weed species than are the currently-used herbicides, including 2,4-D, its salts and esters, and also including sodium trichloroacetate which is used mainly as a grass killer. This acid, and particularly the exo-cis isomer thereof, is highly effective in the control of many species of grasses. However, a few grasses, notably Bermuda grass, are resistant to this acid. Bermuda grass, ordinarily considered a weed grass, is used quite widely in certain areas as a very desirable lawn grass. Therefore, the acid of the invention is contemplated as a selective weedkiller to destroy both broadleafed and grassy weeds in Bermuda grass lawns.

Another outstanding herbicidal value of this acid is that small volumes of quite low concentrations of aqueous solutions thereof may be injected into small holes bored in trunks of various species of trees, or exposed small roots of bushes or of even quite large trees may be placed in such aqueous solutions, with herbicidal effect thereon. Absorption of the acid into the vascular system of higher plants causes unusually drastic phytotoxic effects. This applies more particularly to the exo-cis isomer.

In the case of inducing adventitious root formation or rooting response the acid used in the practice of the invention has practicable application, for example, in the stimulation of root formation at the base of cuttings.

In the practice of the invention there is applied to the plant a composition which contains 3,6-endoxo - 1,2,3,6 - tetrahydro - orthophthalic acid which may be in the form of the acid per se or in other form, such as in the form of the anhydride and/or a salt which contains 3,6-endoxo-1,2,3,6-tetrahydrophthalate anion or anions of ortho configuration, the same as in the case of the acid per se, said anion or anions being either acid or neutral in character, in chemical combination with a sufficiency of cation or cations to satisfy valence requirements, such as one or more metal and/or metalloid cations such as sodium, potassium, calcium, strontium, magnesium, aluminum, iron, cobalt, nickel, zinc, cadmium, mercury, copper, ammonium, mono-, di-, and tri-alkylammonium, mono-, di-, and trialkanolammonium, and mixed alkylalkanolammonium which is N-substituted by from 2 to 3 radicals of the type indicated.

Thus it will be seen that the acid is the active material, and that this is so whether it is used as such, or in the form of a salt, or anhydride, or other form. These changes at the carboxyl groups are mere changes in form rather than changes in substance.

A neutral salt is a salt in which both carboxyl groups of the acid are involved in salt formation, whereas an acid salt is one in which only one of the carboxyl groups of the acid is involved in salt formation. A mixed salt is a salt in which the cations are different. The acid may be used in any of these forms.

The alkylammonium salts such as monoalkylammonium, dialkylammonium, or trialkylammonium preferably have from 1 to 12 carbon atoms in each alkyl group, the totality of carbon atoms preferably being not more than 12. The alkanolammonium salts such as monoalkanolammonium, dialkanolammonium, or trialkanolammonium preferably have from 2 to 3 carbon atoms in each alkanol group. The mixed alkylalkanolammonium salts such as monoalkyl monoalkanolammonium, dialkyl monoalkanolammonium, or monoalkyl dialkanolammonium preferably have from 1 to 4 carbon atoms in each alkyl group and from 2 to 3 carbon atoms in each alkanol group.

By an acid 3,6-endoxo-1,2,3,6-tetrahydrophthalate anion of ortho configuration is meant a univalent anion having a structure defined by the formula

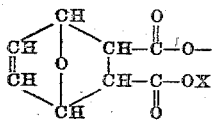

wherein X is a cation, usually considered by modern theory to be hydrogen.

By a neutral 3,6-endoxo-1,2,3,6-tetrahydrophthalate anion of ortho configuration is meant a divalent anion having a structure defined by the formula

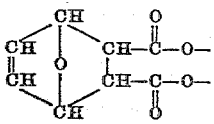

When the acid per se and/or its anhydride is used, its aqueous solution probably contains non-ionized acid and/or anhydride in equilibrium with ionized material.

Examples of monoalkylammonium salts are the monomethylammonium, monoethylammonium, monopropylammonium, monobutylammonium, monoamylammonium, monohexylammonium, monoheptylammonium, monooctylammonium, monononylammonium, monodecylammonium, monoundecylammonium, and monodedecylammonium, and similar monoalkylammonium salts of 3,6-endoxo-1,2,3,6 - tetrahydro - orthophthalic acid.

Examples of dialkylammonium salts are the dimethylammonium, diethylammonium, dipropylammonium, dibutylammonium, diamylammonium, dihexylammonium, methylethylammonium, ethylpropylammonium, propylbutylammonium, butylamylammonium, amylhexylammonium, methylundecylammonium, and similar dialkylammonium salts of 3,6-endoxo-1,2,3,6-tetrahydro-orthophthalic caid.

Examples of trialkylammonium salts are the trimethylammonium, triethylammonium, tripropylammonium, tributylammonium, methyldiethylammonium, ethyldipropylammonium, propyldibutylammonium, methyldiamylammonium, ethyldiamylammonium, methylethylpropylammonium, ethylpropylbutylammonium, and similar salts of 3,6-endoxo-1,2,3,6-tetrahydro-orthophthalic acid.

Examples of monoalkanolammonium salts are the monoethanolammonium, monopropanolammonium, and similar salts of 3,6-endoxo-1,2,3,6-tetrahydro-orthophthalic acid.

Examples of dialkanolammonium salts are the diethanolammonium, dipropanolammonium, ethanolpropanolammonium, and similar salts of 3,6-endoxo-1,2,3,6-tetrahydro-orthophthalic acid.

Examples of trialkanolammonium salts are the triethanolammonium, tripropanolammonium, ethanoldipropanolammonium, propanoldiethanolammonium, and similar salts of 3,6-endoxo-1,2,3,6-tetrahydro-orthophthalic acid.

Examples of monoalkyl monoalkanolammonium salts are the methylethanolammonium, ethylethanolammonium, propylethanolammonium, butylethanolammonium, methylpropanolammonium, ethylpropanolammonium, propylpropanolammonium, butylpropanolammonium, and similar salts of 3,6-endoxo-1,2,3,6-tetrahydro-orthophthalic acid.

Examples of dialkyl monoalkanolammonium salts are the dimethylethanolammonium, diethylethanolammonium, dipropylethanolammonium, dibutylethanolammonium, dimethylpropanolammonium, diethylpropanolammonium, dipropylpropanolammonium, dibutylpropanolammonium, methylethylethanolammonium, methylethylpropanolammonium, ethylpropylethanolammonium, ethylpropylpropanolammonium, propylbutylethanolammonium, propylbutylpropanolammonium, and similar salts of 3,6-endoxo-1,2,3,6-tetrahydro-orthophthalic acid.

Examples of monoalkyl dialkanolammonium salts are the methyldiethanolammonium, ethyldiethanolammonium, propyldiethanolammonium, butyldiethanolammonium, methyldipropanolammonium, ethyldipropanolammonium, propyldipropanolammonium, butyldipropanolammonium, methylethanolpropanolammonium, ethylethanolpropanolammonium, propylethanolpropanolammonium, butylethanolpropanolammonium, and similar salts of 3,6-endoxo-1,2,3,6-tetrahydro-orthophthalic acid.

As pointed out above the salts contemplated include both the acid salts, and the neutral salts, and mixed neutral salts, that is salts in which the cations are different.

The preparation of the acid per se and its equivalents may be accomplished by any means known to the art, and suitable methods will suggest themselves to persons skilled in chemical synthesis upon becoming familiar therewith.

The following specifice examples are illustrative of the preparation of the acid per se, and its equivalents.

EXAMPLE 1

*3,6-endoxo-1,2,3,6-tetrahydro-orthophthalic anhydride*

40 moles of furan, 40 moles of maleic anhydride and 3 liters of isopropyl ether as diluent were introduced into an aluminum reaction vessel equipped with Dry Ice, cooled reflux condenser and agitator. Reaction occurred spontaneously causing the mixture to reflux at a temperature of about 35° C. After reacting at 35° C. or somewhat lower for 7 hours, the ether was removed by vaporization and the above identified product was obtained in 89% yield in the form of a solid cake. It was found to have, without further purification, a neutral equivalent of 81.5 as compared with a theoretical value of 83. This anhydride is relatively unstable at temperatures much above 50° C. and accordingly, its derivatives are preferably prepared at temperatures below about 50° C.

EXAMPLE 2

*3,6-endoxo-1,2,3,6-tetrahydro-orthophthalic acid*

A 3-liter, three-neck flask fitted with thermometer and stirrer was charged with 1 liter of water, 166 g. (1 mole) of 3,6-endoxo-1,2,3,6-tetrahydro-orthophthalic anhydride, and 3 drops of concentrated sulfuric acid. The flask was heated in a water bath, and the mixture was stirred and maintained at a temperature of 35° C. to 40° C. until solution of the anhydride was complete.

The solution was concentrated under vacuum at a temperature of 35° C. to 40° C. until crystallization started, and was then cooled to room temperature. The white 3,6-endoxo-1,2,3,6-tetrahydro-orthophthalic acid which crystallized from the solution was filtered off and dried at room temperature. It weighed 107 g. and melted at 119–121° C.

An additional amount of product could have been obtained by further concentration of the solution.

EXAMPLE 3

*Disodium 3,6-endoxo-1,2,3,6-tetrahydro-orthophthalate*

A solution was prepared which consisted of 66 g. (0.358 mole) of 3,6-endoxo-1,2,3,6-tetrahydro-orthophthalic anhydride dissolved in 300 cc. of methanol. This solution was stirred and cooled to about 20° C. while there was added to it a solution consisting of 28.4 g. (0.71 mole) of sodium hydroxide dissolved in 300 cc. of methanol. Disodium 3,6-endoxo-1,2,3,6-tetrahydro-orthophthalate precipitated as a white solid. After about 15 minutes the solid was filtered off, washed with methanol, and air-dried.

EXAMPLE 4

*Diammonium 3,6-endoxo-1,2,3,6-tetrahydro-orthophthalate*

3,6-endoxo-1,2,3,6-tetrahydro-orthophthalic acid (107 g.) was dissolved in methanol (600 cc.). This solution was maintained between 10° C. and 20° C. while gaseous ammonia was bubbled into it. This procedure resulted in the formation of a solid precipitate, and passage of ammonium through the solution was continued until precipitation was complete. The precipitate consisted of white, powdery diammonium 3,6-endoxo-1,2,3,6-tetrahydro-orthophthalate which was filtered off and air-dried.

EXAMPLE 5

*Sodium acid 3,6-endoxo-1,2,3,6-tetrahydro-orthophthalate*

Dissolve in 1000 cc. of water 166 g. (1 mole) of 3,6-endoxo-1,2,3,6-tetrahydro-orthophthalic anhydride. Stir the solution while a solution of 40 g. (1 mole) of sodium hydroxide in 200 cc. of water is added thereto. Carry out this neutralization between 20° C. and 30° C. Remove water under vacuum at a temperature of about 40° C. Sodium acid 3,6-endoxo-1,2,3,6-tetrahydro-orthophthalate is thus obtained.

EXAMPLE 6

*Sodium ammonium 3,6-endoxo-1,2,3,6-tetrahydro-orthophthalate*

Prepare a solution which contains 83 g. (0.5 mole) of 3,6-endoxo-1,2,3,6-tetrahydro-orthophthalic anhydride dissolved in 500 cc. of water. Prepare another solution which contains 20 g. (0.5 mole) of sodium hydroxide, 8.5 g. (0.5 mole) of ammonia, and 100 cc. of water. Stir the acidic solution while the basic solution is added to it, the neutralization being carried out between 20° C. and 30° C. Remove water under vacuum at a temperature of about 40° C. Sodium ammonium 3,6-endoxo-1,2,3,6-tetrahydro-orthophthalate is thus obtained.

EXAMPLE 7

*Metal salts of 3,6-endoxo-1,2,3,6-tetrahydro-orthophthalic acid*

Completely neutralize a 15% aqueous solution of 3,6-endoxo-1,2,3,6-tetrahydro-orthophthalic anhydride with the calculated quantity of sodium hydroxide dissolved in a small amount of water, thus providing a concentrated aqueous solution of disodium 3,6-endoxo-1,2,3,6-tetrahydro-orthophthalate. Carry out this neutralization between 20° C. and 30° C.

Make an aliquot portion of this solution, containing 0.5 mole of the disodium salt, slightly acidic by addition of a few drops of hydrochloric acid. Then introduce with stirring a concentrated aqueous solution containing 0.5 mole of zinc chloride. The desired zinc salt which is considerably less soluble than the disodium salt, slowly precipitates. The zinc 3,6-endoxo-1,2,3,6-tetrahydro-orthophthalate is filtered off, washed, and dried.

By this same methathetic method the calcium, strontium, magnesium, aluminum, iron, cobalt, nickel, cadmium, mercury, and copper salts are obtained.

EXAMPLE 8

*Alkylammonium 3,6 - endoxo-1,2,3,6-tetrahydro-orthophthalates*

A methanol solution of 3,6-endoxo-1,2,3,6-tetrahydro-orthophthalic acid was prepared. To a portion of this solution was introduced with stirring an amount of monoethylamine sufficient to neutralize both carboxyl groups, the temperature being maintained below 40° C. The methanol was then removed by application of vacuum while maintaining the temperature below 40° C., and the residue thus formed was washed with acetone, filtered and freed of solvent to yield the desired bis(ethylammonium) salt in substantially theoretical yield. It was a white crystalline solid easily soluble in water.

The foregoing procedure was repeated with the substitution for the monoethylamine of the following amines, respectively: monomethylamine, monopropylamine, monobutylamine, monooctylamine, dimethylamine, diethylamine, diisopropylamine, dibutylamine, dioctylamine, trimethylamine, triethylamine, triisopropylamine, tributylamine and trioctylamine. In general the water solubility of the products thus obtained diminished with increase in the total number of carbon atoms in the substituent alkyl groups.

In another series of experiments the above enumerated amines were treated with the same dibasic acid, but in this instance the amount of amine introduced was equivalent to only one carboxyl group. The monobasic substituted ammonium salts thus obtained were found to be substantially soluble in water and alcohol but less so than the corresponding dibasic salts.

EXAMPLE 9

*Diethylammonium butylammonium 3,6-endoxo-1,2,3,6-tetrahydro-orthophthalate*

Dissolve 83 g. (0.5 mole) of 3,6-endoxo-1,2,3,6-tetrahydro-orthophthalic anhydride in 1500 cc. of water. Prepare a mixture which consists of 36.5 g. (0.5 mole) of diethylamine and 36.5 g. (0.5 mole) of butylamine. Slowly add the mixed amines, with vigorous stirring, to the above aqueous solution. Maintain the temperature below 40° C. during the neutralization. Then remove water under vacuum while keeping the temperature below 40° C. The product thus obtained is diethylammonium butylammonium 3,6-endoxo-1,2,3,6-tetrahydro-orthophthalate.

EXAMPLE 10

*Alkanolammonium and alkylalkanolammonium 3,6-endoxo-1,2,3,6-tetrahydro-orthophthalates*

Dissolve 83 g. (0.5 mole) of 3,6-endoxo-1,2,3,6-tetrahydro-orthophthalic anhydride in 1000 cc. of water, thus providing an aqueous solution of 3,6-endoxo-1,2,3,6-tetrahydro-orthophthalic acid. Slowly add to this solution, with vigorous stirring, an amount of diethanolamine sufficient to neutralize both carboxyl groups. Maintain the temperature below 40° C. during the neutralization. Then remove water under vacuum while maintaining the temperature below 40° C. The residue consists of bis(diethanolammonum) 3,6-endoxo-1,2,3,6-tetrahydro-orthophthalate.

The same procedure is employed to prepare the corresponding salts of monoethanolamine, triethanolamine, ethylaminoethanol, and diethylaminoethanol.

EXAMPLE 11

*Sodium triethylammonium 3,6-endoxo-1,2,3,6-tetrahydro-orthophthalate*

Prepare a solution of 3,6-endoxo-1,2,3,6-tetrahydro-orthophthalic acid by dissolving the corresponding anhydride (1.7 g., 0.01 mole) in water (20 cc.). To this solution add triethylamine (1.0 g., 0.01 mole) and a solution of sodium hydroxide (0.4 g., 0.01 mole) in water (4 cc.). There is thus obtained an aqueous solution of sodium triethylammonium, 3,6-endoxo-1,2,3,6-tetrahydro-orthophthalate. If desired, the dry salt may be obtained by vacuum evaporation of this solution at about 30° C.

While the above examples pertain more particularly to the preparation of the exo-cis isomer, any of the procedures known in the art may be employed to prepare the exo-cis isomer, the endo-cis isomer or the trans isomer.

Although the applicants do not wish to be bound by any particular theory as to the mechanism whereby the above-described useful plant response effects are produced, a considerable amount of experimentation has strongly indicated that said effects are brought about by the existence in aqueous media of 3,6-endoxo-1,2,3,6-tetrahydro-orthophthalate anion or anions (acid and/or neutral). Both neutral anion and acid anion are effective. A salient feature of this theory is that the acid used in the practice of the invention, when applied as the acid per se, or in other form, to a living plant, makes 3,6-endoxo-1,2,3,6-tetrahydro-orthophthalate anion or anions (acid and/or neutral) available to the plant, at or near the site of application, and through translocation phenomena, at points far removed from the site of application.

The desired anion or anions are made available by virtue of the fact that the acid per se, and its other forms, are water-soluble and ionizable. Therefore, when such a compound is absorbed into the vascular system of a plant, it dissolves in the aqueous plant juices and provides the functioning anion or anions. The resulting physiological activity is believed to be ascribable to the presence of anion or anions, whether or not assisted by the presence of any particular cation or cations. The acid per se and its other forms may thus be regarded as very convenient media for furnishing the desired anion or anions to susceptible portions of the plant.

It follows, therefore, that the acid per se and its other forms are equally usable.

In actual practice it has been found that in certain applications in certain regions, such as arid regions, some forms of the acid are absorbed by the plant surfaces more efficiently than other forms. In humid regions, plants, such as cotton for instance, absorb the active ingredients more readily than in arid regions. In the latter regions it is better to apply the acid in the form of a water solution of a salt which does not tend to crystallize on leaf surfaces, such as an amine salt, and/or in admixture with an adjuvant, such as a wetting agent and/or humectant. However, it is to be understood that the active ingredient, irrespective of its physical form (e. g. in solution or as a dust), may be applied in some other way to assure its absorption by the plant, such as over or in a wounded surface, or by injection, or by direct application to the roots of the plant. Hence it may at times be a matter of choice and judgment as to the very best means of application of the particular compound in the particular region and for the particular purpose under consideration.

The acid per se has an appreciable solubility in water. The other forms are also soluble in water. Some of them are highly soluble. Others have a lesser degree of solubility. However, it is preferred to employ compounds having a solubility in water to the extent of at least 0.1% by weight, and still more particularly of at least 1% by weight.

From the foregoing it will be appreciated that for plant response purposes very low concentrations in applied aqueous solutions are effective. For example, in the defoliation of young bean plants a concentration of .05% by weight in applied aqueous solution of the compound employed, such as the disodium salt of the exo-cis isomer has been found to be effective.

The compounds are applied to the crop or plants in any desired manner, such as, in the form of a solid, for example by dusting, or in the form of a liquid, for example by spraying. They may also be employed by injection, such as into the stem of the plant, or at a point at which the epidermal layer is broken or wounded, or to the roots of the plant, or otherwise.

Compositions may be formulated by admixing the active ingredient with any desired liquid or solid carriers such as any of the finely divided solid carriers known in the dusting art, which are preferably of large surface area, such as a clay, for example, fuller's earth, pyrophyllite, talc, bentonite, kieselguhr, diatomaceous earth, etc. Any of the commercial clays available on the market in finely divided form are highly satisfactory, and particularly those which are normally employed as insecticide carriers. Commercial clays, it will be understood, are generally identified by trade names (reflecting the source and mode of processing) of which Homer clay, Celite, and Tripoli may be mentioned as typical.

Non-clay carriers which may be formulated with the active material include, for example, sulfur, volcanic ash, calcium carbonate, lime, by-product lignin, lignocellulose, flour such as wood, walnut shell, wheat, soy bean, potato, cotton seed, etc.

Any desired mixture may be prepared by any suitable method. Thus, if a solid, the active material may be ground to a fine powder and tumbled together with the powdered carrier, or the carrier and the active agent may be ground together; alternatively, the active material in liquid form, including solutions, emulsions and suspensions thereof, may be admixed with the finely divided carrier in amounts small enough to preserve the requisite free-flowing property of the final dust composition. Or excess liquid may be removed such as by vaporization, for example, under reduced pressure.

When solid compositions are employed, in order to obtain a high degree of plant coverage with minimum poundage per acre, it is desirable that the composition be in finely divided form. Preferably the dust containing the active ingredient should be sufficiently fine that substantially all will pass through a 50 mesh sieve, and more particularly through a 200 mesh sieve. Excellent results have been obtained in which the dust composition consisted predominantly of particles in the range from 15 to 45 microns. Finer dusts, such as those consisting largely of particles in the range of 5 microns and below, have excellent covering capacity, but are somewhat more subject to drift, and are more expensive to prepare.

For spray application the active ingredient may be dissolved or dispersed in a liquid carrier such as water or an oil. Suitable oils for herbicidal application include those of petroleum, animal, vegetable, or synthetic origin, such as kerosene, fuel oil, lubricating oil, soy bean oil, linseed oil, castor oil, sperm oil, cod liver oil, etc. For defoliation or rooting response application, oils are usually selected which in themselves are relatively harmless to the plant.

Aqueous solutions or dispersions are economical and desirable. In general, the choice of the particular liquid carrier employed may be guided somewhat by prevailing circumstances, such as its availability, its solubility or dispersion characteristics toward the particular active agent employed, and/or its toxicity toward the plants undergoing treatment. In general, water is an excellent liquid carrier.

Thus spray formulations comprising the active ingredient in the form of a solution, suspension, or emulsion in aqueous or non-aqueous media may be employed.

Emulsions or dispersions of the active ingredient in the liquid carrier may be prepared by agitation of the agent with the carrier. This is commonly done at the time of spraying. Preferably, however, the agitation should take place in the presence of an emulsifying or dispersing agent (surface active agent) in order to facilitate the preparation of said emulsion or dispersion. Emulsifying and dispersing agents are well known in the art, and include, for example, fatty alcohol sulfates, such as sodium laurylsulfate, aliphatic or aromatic sulfonates, such as sulfonated castor oil or the various alkarylsulfonates (such as the sodium salt of monosulfonated nonyl naphthalene), and non-ionic types of emulsifying or dispersing agents such as the high molecular weight alkyl polyglycolethers or analogous thioethers, such as the decyl, dodecyl, and tetradecyl polyglycolethers and thioethers containing from 25 to 75 carbon atoms.

For convenience, the emulsifying or dispersing agent is mixed with the plant response agent prior to admixture with the carrier, and the preparation of the emulsion or dispersion is accomplished at the place where the spraying is to be undertaken merely by agitating said mixture with the carrier, particularly when aqueous. The plant response agent, if not soluble in the carrier in the concentration desired, may be dispersed as such, or may be dissolved in a solvent, and emulsified by agitation with the carrier. This applies particularly when water and oil are employed as the carrier.

The concentration of surface active agent in the final emulsion or dispersion should be sufficient to make the phases readily dispersible, and in general for this purpose from 0.02% to 2% is satisfactory. Any desired additional amount may be added, such as for adjuvant purposes, as will be understood. Thus, if the surface active agent is to be premixed with the plant response agent, the selected relative proportions of the two will largely depend upon the purposes in mind. For mere purposes of forming spray emulsions of dispersions, mixtures containing a surface active agent to the extent of from about 1% to about 25% by weight of plant response agent are satisfactory. However, it is to be understood that the proportion may be varied over a wide range, particularly if pronounced adjuvant effects are desired.

Emulsifying and dispersing agents usually also possess the properties of wetting agents, and in this capacity greatly assist in bringing about efficient contact between liquid and the plant.

The use, if desired, of adjuvants, such as wetting agents and/or humectants, is also contemplated in connection with solutions of the active ingredient, such as water solutions. Any suitable wetting agent and/or humectant may be employed for this purpose, such as the wetting agents more particularly referred to herein. Examples of humectants are glycerine, diethylene glycol, ethylene glycol, polyethylene glycols generally, mixtures of glucose and fructose, and corn syrup.

For adjuvant purposes, any desired quantity of wetting agent may be employed, such as up to 250% or more based on active ingredient. For wetting purposes, the amount of adjuvant used may be considered to be that required to impart the desired wetting qualities to the spray solution as formulated, such as approximately .05% by weight of the spray solution. The use of considerably larger amounts is not based upon wetting properties, although present, but is a function of the physiological behavior of the wetting agent after spraying upon the plant. It has been shown, for instance, that the amount of active ingredient necessary to produce good cotton defoliation may be reduced to as low as ½ pound per acre if employed with a rate of wetting agent as high as 1 pound per acre.

It should be considered that once the solution has been sprayed upon the plant, the concentration of wetting agent existing upon the leaf is in no sense a function of the concentration existing in the original spray solution. Thus, evaporation might concentrate the wetting agent considerably, or the presence of a dew on the leaf surface, or of plant juices on the leaf surface might considerably dilute this agent. Spray rates normally run from 1 to 20 gallons per acre. Dews may vary from possibly 10 to 2000 gallons per acre.

Wetting agents appear to serve the multiple purposes of aiding in the penetration of the leaf surface by the active ingredient, spreading of the active ingredient over the leaf area, and retarding or preventing crystallization in the case of those forms of the active ingredient which show a tendency to crystallize when the spray dries.

Although the active ingredient may be applied to the growing plant in concentrated form, it is usually desirable to employ liquid or solid formulations, for example as discussed above in which the active ingredient constitutes less than 30% by weight of the total, such as less than 10% and even as low as 0.1%.

Other substances than the carrier and/or surface active agent may be included in the solid or liquid formulations, if desired, to bring about various physical improvements such as the prevention of lumping during storage, or improvement in respect to coverage, moisture adsorption, adherence, etc. Likewise, other substances may be included in said formulations, if desired, to accomplish various physiological results. For example, it may at times be expedient to include singly or in combination substances such as fungicides, insecticides, bactericides, or types of plant reponse agents other than those agents discussed herein. The preparation of uch additions and the materials added do not require elaboration, but will suggest themselves to persons skilled in the art upon becoming familiar herewith.

In practice of the process as applied to defoliation, the rate of application (i. e. the amount of active ingredient per crop unit) for best results will depend among other factors upon the species of plants being treated and upon their maturity.

As a rule the more mature the plant at the time of application, the less active material is required. In practice the crop is normally treated for defoliation purposes, 1 or 2 weeks prior to harvesting. In some instances, more than one application may be desirable, especially if heavy rains or winds should occur soon after the application, or to obtain an accumulative effect. Then too, in order to avoid possible injury to any particular crop, it may be desirable for an inexperienced operator to apply the defoliant initially at a relatively low rate, and to follow with a second application if necessary after observation of the first effects, to obtain the degree of defoliation desired.

Effective rates of application, for defoliation purposes, may sometimes be as low as 0.1 pound per acre when defoliating a susceptible plant at near maturity. Use of dosages greatly in excess of the minimum required for good defoliation may result in shock to the plant with attendant injury to the remainder of the plant.

In fact the plant response agent of the present invention is an effective herbicide when used in amounts substantially greater than those required for defoliation, and it may be used advantageously for the killing of plants or vines (as in the case of potatoes) when desired, such as, for the killing of undesired plants, for example weeds or grasses, or for the killing of crops, irrespective of whether such undesired plants or crops are of species which lend themselves to defoliation.

Thus when defoliation is the objective the quantity applied should be sufficient to cause at least the major portion of the leaves to dry up and/or to drop from the living plant, but insufficient to cause substantial herbicidal action on the plant. On the other hand, when plant killing is the objective, any amount sufficient for this purpose may be applied. In the latter connection, since different species of plants vary markedly in their relative resistance to herbicidal action, selective killing of plant species may be practiced. Such selectivity may be varied by compounding, such as with adjuvants, for example, wetting agents.

Application of the active ingredient of the present invention to the stems of plant cuttings promotes the growth of roots at or near the zone of application. By such treatment of cuttings prior to planting, mortality is substantially reduced. A convenient and effective procedure is to mix the active ingredient with a viscous liquid or paste, such as lanolin or a high molecular weight ethylene oxide condensation product, i. e. a polyglycol ether. Any other viscous or pasty substance capable of adhering to the stem of the cutting may be employed for this purpose providing, of course, that it is not injurious to the stem. The amount of active agent necessary to induce rooting response is small and normally from 1 to 10 milligrams of active ingredient per cutting is sufficient. Use of excessive quantities is undesirable.

The following examples illustrate the invention (generally and without limitation to the specific form of the active ingredient employed) as applied to the treatment of various plants to produce various plant responses including defoliation and herbicidal action, the specific isomer being the exo-cis.

EXAMPLE 12

Young bean plants were treated individually with 3,6-endoxo-1,2,3,6-tetrahydro-orthophthalic anhydride in the following manner. 0.1 cc. of an aqueous solution of said compound was applied to each of the two primary leaves of each plant. Some plants were treated with solutions of 0.1% concentration, others with solutions of 1.0% concentration, and observations were made after 2, 4 and 8 days, respectively. In the case of the 0.1% concentration, approximately 90% primary leaf abscission had occurred by the 8th day without appreciable injury to the plant, whereas at the 1.0% concentration 100% primary leaf abscission had occurred along with 20% plant mortality.

Comparable results were obtained when disodium 3,6-endoxo-1,2,3,6-tetrahydro-orthophthalate was used instead of the above anhydride, and they were also comparable when bis(diethylammonium) 3,6- endoxo - 1,2,3,6 - tetrahydro-orthophthalate was used.

For purposes of comparison, a similar procedure was followed in which ammonium thiocyanate, calcium cyanamide, and sodium thiocyanate, respectively, were substituted for the above anhydride. In no instance was defoliation more than 10% as complete.

An interesting and important characteristic of the acid of this invention is its ability to transmit its effects to portions of the plant considerably removed from the point of treatment. This behavior, which is known as translocation, is illustrated by the following example.

EXAMPLE 13

Young black valentine bean plants were treated with 1 mg. portions of a waxy mixture comprising 0.5% of 3,6-endoxo-1,2,3,6-tetrahydro-orthophthalic acid, and 99.5% of a high molecular weight polyglycol ether (polymerized ethylene oxide) as carrier. The plants were divided into 7 groups and the paste containing the active ingredient was carefully applied to a specific portion of each plant. Application to plants of group 1 was made on the basal abscission plane of both primary leaves; to plants of group 2 on apical abscission lines of both primary leaves; to plants of group 3 on the center of mid-veins of primary leaves; to plants of group 4 on basal parts of mid-veins of primary leaves; to plants of group 5 on centers of first internode; to plants of group 6 on centers of hypercotyls; to plants of group 7 on leaves of first trifoliate.

At the end of 6 days in all instances considerable defoliation had occurred, involving the primary (2nd node) leaves.

EXAMPLE 14

Field plots of soy beans, approximately 150 sq. ft. in area, were sprayed with aqueous solutions of 3,6-endoxo - 1,2,3,6-tetrahydro-orthophthalic anhydride at rates of 3 pounds per acre and 6 pounds per acre of active ingredient, respectively. The concentration of the solution at the lower rate was 0.5%, and at the higher rate was 1.0%. Although the plants had not quite reached suitable maturity for optimum defoliation, it was observed after 12 days that about 15% defoliation had occurred and a substantial portion of the non-abscised leaves were withered in the plots where 3 pounds per acre had been applied. At the 6 pound rate, 50% defoliation had occurred and practically no healthy leaves remained.

EXAMPLE 15

The procedure of the preceding example was repeated with the exception that the solution of the plant response agent contained 0.1% of a wetting agent. In this instance the extent of defoliation exceeded that of the preceding example at the end of 8 days and, after 12 days almost complete defoliation had occurred both at the 3 and the 6 pound per acre rates. In the plots where 3 pounds per acre were used, the vines were substantially unharmed, whereas at the higher rate, there was evidence of slight injury.

EXAMPLE 16

Small garden plots of flowering cotton plants were sprayed with dilute aqueous solutions of 3,6-endoxo-1,2,3,6-tetrahydro-orthophthalic anhydride at rates of 2, 4, 8, and 16 pounds of active ingredient per acre, respectively. Defoliation was quite incomplete and with increase in dosage, a progressive increase in injury to the plant and blossoms was observed. This is in contrast with results attained by analogous treatment of mature cotton plants in which instance almost complete defoliation was observed at rates of application in the range from 2 to 10 pounds per acre with substantially no injury to the vine or bolls.

EXAMPLE 17

30 sq. ft. field plots of nearly mature sweet potato plants were sprayed with dilute aqueous solutions of 3,6 - endoxo - 1,2,3,6 - tetrahydroorthophthalic anhydride at dosages of 6 and 12 pounds of active ingredient per acre, respectively. After 8 days all plants had undergone fairly complete defoliation. The vines were only slightly injured in the plots where the lower dosage was employed, but at the 12 pound rate appreciable blackening and shriveling of the vines was observed, which is usually desirable for harvesting purposes. Repetition of this procedure with the substitution of a commercial defoliant, ammonium thiocyanate, as the active agent resulted in only insignificant defoliation, about 50% of the leaves being burned or withered at the higher rate of application.

EXAMPLE 18

Small garden plots of black valentine beans, tomatoes and golden bantam corn, respectively, were sprayed with 0.5% aqueous solutions of 3,6-endoxo - 1,2,3,6 - tetrahydro - orthophthalic anhydride in amounts sufficient to wet the foliage. In the case of the beans and the tomatoes almost complete leaf abscission had occurred 8 days after treatment, the few adhering leaves being withered and dehydrated. The tomatoes showed slight injury to the terminal parts of the main stems. The corn, which is known to be incapable of undergoing leaf abscission, showed extensive injury and shriveling of the terminal sections of the leaves.

EXAMPLE 19

A number of species of plants of the type commonly characterized as nursery stock were treated, about one month prior to normal defoliation, with aqueous solutions of 3,6-endoxo-1,2,3,6-tetrahydro-orthophthalic anhydride. In each instance the solution was sprayed on the foliage at concentrations of 1000, 1750 and 2500 parts per million, respectively. An appreciable hastening of defoliation occurred in the case of the following plants: white flowered Hibiscus, *Spiraea vanhoutte*, winged Euonymus, *Eleagnus umbellata*, *Euonymus alata compacta*, Thompson's privet and *Chenomeles japonica*. The effect was more marked in the case of plants treated with the highest dosage. No injury to the stem structure was observed.

EXAMPLE 20

A one-half per cent aqueous solution of disodium 3,6 - endoxo - 1,2,3,6 - tetrahydro - orthophthalate was used to spray potted plants, at dosages calculated to be from 0.38 to 18 pounds per acre. Pots containing relatively mature rye plants evidenced considerable burning of the leaves at dosages between two to four pounds per acre. At dosages above this range kill of the plants was obtained. Corn, another example of a monocotyledon, behaves in a similar manner. The corn plants used were approximately two weeks old. Young shoots of alfalfa were slightmore sensitive.

The experiment was repeated using a one-half per cent aqueous solution of the acid per se to spray the potted plants. Results were substantially the same.

the treatments were observed after 9 days. The results are summarized in the following table.

Table 1

| Plant species | Results |
| --- | --- |
| Young garden beans | Leaves killed. |
| Balbo rye | Some leaves killed. |
| Bermuda grass | No injury. |
| Persimmon | Leaves killed. |
| Pokeberry | Some leaves killed. |
| Hackberry | No injury. |
| Gooseberry | Discoloration of leaves; also defoliation. |
| Sumac | Leaves killed or severely injured; also defoliation. |
| Elm | Killed ⅘ of leaf area. |
| Siberian peas | Accelerated defoliation. |

EXAMPLE 24

The leaves of aquatic plants were thoroughly wetted by spraying them with 0.1%, 0.125%, and 0.25% aqueous solutions, respectively, of 3,6-endoxo - 1,2,3,6 - tetrahydro - orthophthalic anhydride. In some instances, both the upper and lower surfaces of the leaves were sprayed. In other instances, only the upper surfaces were sprayed. The results are given in the following table.

Table 2

| Plant species | Concentration of anhydride | Spray applications | Time after treatment | Results |
| --- | --- | --- | --- | --- |
| | Per cent | | Days | |
| Water hyacinth | 0.125 | Upper leaf surfaces | 4 | Some leaves killed. |
| Do | 0.125 | do | 8 | Do. |
| Do | 0.125 | Both leaf surfaces | 4 | Leaves killed. |
| Do | 0.125 | do | 8 | Do. |
| Do | 0.25 | Upper leaf surfaces | 4 | Do. |
| Do | 0.25 | do | 8 | Do. |
| Do | 0.25 | Both leaf surfaces | 4 | Do. |
| Water lilies | 0.25 | Upper leaf surfaces | 8 | Do. |
| Duckweed | 0.1 | do | 6 | No noticeable effect. |
| Do | 0.25 | do | 6 | Loss of green color. |

EXAMPLE 21

Young black valentine bean plants were grown in 3 inch pots containing soil in such a manner that a portion of the roots were exposed. 10 cc. of a 0.1% aqueous solution of 3,6-endoxo-1,2,3,6-tetrahydro-orthophthalic acid was applied to the exposed roots. In all cases the plants were dead at the end of seven days.

This example illustrates more particularly the herbicidal effect of the acid of this invention when applied to the roots of a plant.

EXAMPLE 22

A large field overgrown with various weeds common to the New Jersey area was sprayed with aqueous solutions of 3,6-endoxo-1,2,3,6-tetrahydro-orthophthalic anhydride at a rate of approximately 10 pounds of active ingredient per acre. Within a few days pronounced burning and destruction of golden rod, daisy and ragweed was apparent. At the other extreme, honey-suckle, switch grass and lamb's quarter were only slightly affected, indicating that higher dosages are required for herbicidal action on these species.

EXAMPLE 23

Various plant species were sprayed with a 0.25% aqueous solution of 3,6 - endoxo - 1,2,3,6 - tetrahydro-orthophthalic anhydride. The effects of

EXAMPLE 25

Aqueous solutions containing 0.1%, 0.5%, and 1%, respectively, of disodium 3,6-endoxo-1,2,3,6-tetrahydro-orthophthalate were prepared. 0.05 cc. aliquots of each of these solutions were injected into the hypocotyls of young bean plants. In all instances, burning of the leaves was evident when observations were made 19 hours after injection of the solutions. The extent of burning was greater in the case of the 0.5% and 1% solutions than in the case of the 0.1 solution.

Parallel experiments were made with bis(diethylammonium) 3,6 - endoxo-1,2,3,6-tetrahydro-orthophthalate, with substantially the same results.

EXAMPLE 26

A weed plot in which flowering morning glories predominated was sprayed with a 1% aqueous solution of 3,6-endoxo-1,2,3,6-tetrahydro-orthophthalic anhydride at a rate of 100 gallons per acre (i. e., approximately 8 pounds of active ingredient per acre). In a week the morning glory plants were badly injured and in four weeks they had died.

EXAMPLE 27

A weed plot in which ragweed was the predominant species was sprayed with a 1% aqueous solution of 3,6-endoxo-1,2,3,6-tetrahydro-orthophthalic anhydride, to which 0.1% of a wetting agent had been added. The rate of application was 110 gallons per acre (i. e., approximately 9 pounds of active ingredient per acre). In a month all plants had died.

EXAMPLE 28

Smartweed plants 4 to 5 feet high were sprayed with a 1% aqueous solution of 3,6-endoxo-1,2,3,6-tetrahydro-orthophthalic anhydride at a rate of 77 gallons per acre (i. e., approximately 6 pounds of active ingredient per acre). In 10 days most of the leaves were considerably withered, the terminal portions of the stems were markedly dehydrated, and most of the seeds borne on the terminal portions of the plants were dehydrated.

EXAMPLE 29

A weed plot in which panic grass, averaging 6 feet high, was the predominant weed, was sprayed with a 1% aqueous solution of 3,6-endoxo-1,2,3,6-tetrahydro-orthophthalic anhydride containing 0.1% of a wetting agent, at a rate of approximately 16 pounds of active ingredient per acre. In two weeks the plants were severely injured, much more so than similar plots sprayed with 2,4-D and with sodium pentachlorophenate at approximately 16 pounds per acre.

EXAMPLE 30

A weed plot in which a species of goldenrod in flower, the plants averaging about 4 feet high, was sprayed with a 0.5% aqueous solution of 3,6-endoxo-1,2,3,6-tetrahydro-orthophthalic anhydride at a rate of 200 gallons per acre (i. e., approximately 8 pounds of active ingredient per acre). In three weeks about 25% of the plants had died and the rest were dying as was indicated by the withered leaves and flowers and by the severely dehydrated stems. In contrast, a similar plot sprayed with an aqueous solution of the triethylammonium salt of 2,4-D at the same gallonage per acre, in three weeks showed less damage to the plants than in the case of the above anhydride.

EXAMPLE 31

A weed plot in which crabgrass predominated was sprayed with a 1% aqueous solution of 3,6-endoxo-1,2,3,6-tetrahydro-orthophthalic anhydride at a rate of 200 gallons per acre (i. e., approximately 16 pounds of active ingredient per acre). In 18 days the grass was severely burned. A similar plot sprayed with a 1% aqueous solution of sodium chlorate at a rate of 200 gallons per acre, in 18 days showed considerable burning of the grass, but the effects were less marked than in the plot treated with the above anhydride.

EXAMPLE 32

10 cc. of a 0.25% aqueous solution of 3,6-endoxo-1,2,3,6-tetrahydro-orthophthalic anhydride was poured onto the soil of 3-inch flower pots in each of which a young bean plant was growing. Eight such plants were thus treated. In six days all of the plants had died.

EXAMPLE 33

The comparative degree of inhibition of growth of germinating cucumber seedlings caused by 3,6-endoxo-1,2,3,6-tetrahydro-orthophthalic anhydride and by coumarin, respectively, was determined by introducing 15 cc. portions of aqueous solutions of various concentrations of these compounds into 150 mm. petri dishes, each of which contained 25 seeds. A control was run in a similar way, using 15 cc. of water. In each instance, approximately 95% of the seeds germinated within four days. The main root of each germinated seedling was measured at this time, and the average length of roots for each group was calculated. It will be noted from a comparison of root lengths in the following tabulation that the above anhydride inhibited root development, as compared with the untreated seedlings, quite markedly at 10 p. p. m. and higher concentrations, the degree of inhibition varying with the concentration. It will also be noted that the anhydride inhibited root development much more than did coumarin.

*Table 3*

Average length in mm. of the main root of germinated cucumber seedlings after four days incubation period

| Material | 1 ppm | 10 ppm | 100 ppm | 1000 ppm |
|---|---|---|---|---|
| Untreated | 71.8 mm. | 71.8 mm. | 71.8 mm. | 71.8 mm. |
| Above anhydride | 73.2 | 34.3 | 12.8 | 2.0 |
| Coumarin | 72.7 | 66.6 | 72.6 | 32.8 |

From the foregoing it can be seen that the acid used in the practice of this invention, whether used per se or in some other form, is highly effective in regulating the growth characteristics of viable or living plants, and particularly of plants having vascular systems. For example, the acid may be employed to hasten defoliation of plants which defoliate naturally, or may be employed to terminate the life cycle of plants, or may be employed to retard the growing of seeds, or may be employed to selectively stunt or terminate the growth of certain unwanted plants to facilitate and favor the growth of wanted plants, or may be employed to terminate the growth of vines in favor of, or to facilitate harvesting of, the fruits of such vines, or may be employed to stimulate root growth on cuttings, etc. Other applications of the invention in the regulation of the growth characteristics of plants will occur to persons skilled in the art upon becoming familiar herewith.

Accordingly, it is to be understood that the particular description is by way of illustration and that the patent is intended to cover by suitable expression in the claims whatever features of novelty reside in the invention.

This application is a continuation-in-part of our copending application Serial No. 81,026, filed March 11, 1949.

We claim:

1. A method for regulating the growth characteristics of a plant, comprising treating said plant with 3,6-endoxo-1,2,3,6-tetrahydro-orthophthalic acid.

2. A method for inducing plant response in a living plant, comprising treating said plant with exo-cis-3,6-endoxo - 1,2,3,6 - tetrahydro - orthophthalic acid.

3. A method for hastening defoliation of a living plant which defoliates naturally, which comprises treating said plant with an effective amount of exo-cis-3,6-endoxo-1,2,3,6,-tetrahydro-orthophthalic acid in a manner to cause said acid to penetrate the epidermal layer of said plant, said amount being insufficient to kill said plant.

4. The process of claim 3 in which the acid is brought into contact with the surface of said plant in a manner to cause said acid to be absorbed by the vascular system of said plant through said surface.

5. The process of claim 4 in which the acid is sprayed in aqueous solution onto said plant.

6. The process of claim 5 in which said aqueous solution contains a wetting agent.

7. The process of claim 4 in which the acid is applied in the form of a dust diluted with a solid carrier.

8. A method for killing a viable plant comprising applying to said plant an amount effective for killing said plant of exo-cis-3,6-endoxo-1,2,3,6-tetrahydro-orthophthalic acid.

9. The method of claim 8 in which the acid is applied in aqueous solution to said plant.

10. The process of claim 9 in which said aqueous solution contains a wetting agent.

11. A method for inducing a response in a living plant having a vascular system, comprising bringing into association with said vascular system of said plant an effective amount of anion of exo-cis-3,6-endoxo-1,2,3,6-tetrahydro-orthophthalic acid.

12. A composition prepared for use as a plant response agent comprising 3,6-endoxo-1,2,3,6,-tetrahydro-orthophthalic acid and a wetting agent.

13. A composition prepared for use as a plant response agent comprising exo-cis-3,6-endoxo-1,2,3,6-tetrahydro-orthophthalic acid, a wetting agent, and a carrier.

14. The composition of claim 13 in which the carrier is a liquid.

15. The composition of claim 13 in which the carrier is a finely divided solid.

16. A composition prepared for use as a plant response agent comprising exo-cis-3,6-endoxo-1,2,3,6-tetrahydro-orthophthalic acid and a wetting agent.

17. A composition prepared for use as a plant response agent comprising exo-cis-3,6-endoxo-1,2,3,6-tetrahydro-orthophthalic acid, a wetting agent, and an aqueous carrier.

18. A method for inducing a response in a living plant which comprises applying to the surface of said plant in amount sufficient to produce said response a compound which when in the presence of water yields anions of exo-cis-3,6-endoxo-1,2,3,6-tetrahydro-orthophthalic acid.

19. A composition prepared for use as a plant response agent which comprises a wetting agent, and a compound which when in the presence of water yields anions of exo-cis-3,6-endoxo-1,2,3,6-tetrahydro-orthophthalic acid.

NATHANIEL TISCHLER.
ERNEST P. BELL.

REFERENCES CITED

The following references are of record in the file of this patent:

UNITED STATES PATENTS

| Number | Name | Date |
| --- | --- | --- |
| 2,471,790 | Sowa et al. | May 31, 1949 |